Figure 1:
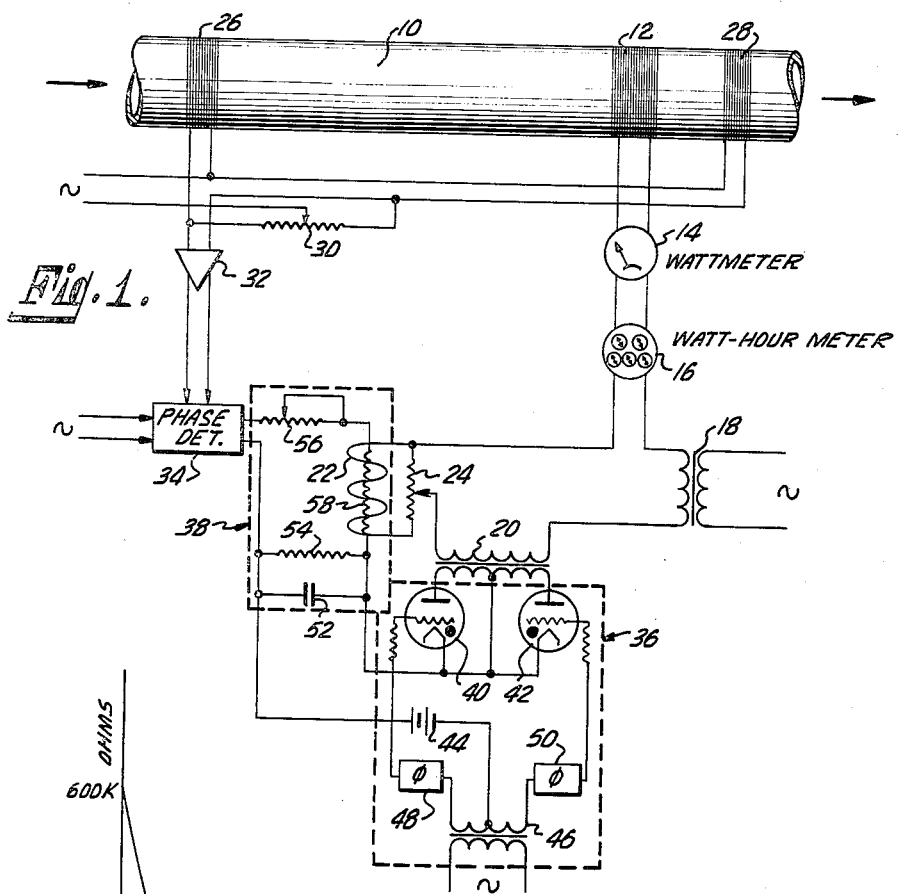

Aug. 1, 1961  J. H. LAUB  2,994,222

THERMAL FLOWMETER

Filed Oct. 9, 1958

INVENTOR.
JOHN H. LAUB

BY
Christie, Parker & Hale
ATTORNEYS.

United States Patent Office 2,994,222
Patented Aug. 1, 1961

2,994,222
THERMAL FLOWMETER
John H. Laub, 1340 El Mirador Drive, Pasadena, Calif.
Filed Oct. 9, 1958, Ser. No. 766,348
5 Claims. (Cl. 73—204)

This invention relates to flowmeters, and more particularly, is concerned with an improved circuit for measuring fluid flow.

Flowmeters based on the principle of utilizing the rate of heat transfer through the boundary layer of a fluid as a measure of the mass rate of flow have heretofore been proposed. A flowmeter operating on this electrocaloric principle is described in Patent No. 2,729,976. The meter therein described is capable of measuring both rate and quantity of flow through a fluid conduit without interfering with the free flow of the confined fluid medium. The flowmeter involves the use of a heat exchanger in which heating means constitutes one element and the flowing medium constitutes the other element, heat being transferred to the flowing medium. Servo means is provided for varying the heat transfer to maintain a constant temperature difference in the flowing medium in passing the point of heat exchange regardless of flow rate. The rate of flow in the turbulent range is approximately proportional to the wattage input W to the heater and inversely proportional to $\Delta t$, the temperature differential produced by the heat transfer. Thus by measuring the wattage required to maintain a constant temperature differential with varying rates of flow, the rate of flow can be continuously measured in terms of watts input. See the article "Measuring Mass Flow" by J. H. Laub in Control Engineering, March 1957, page 112.

Because of the large thermal lag inherent in a system of this type, a time delay circuit, preferably a resistance-capacitance type of integrating network, is provided in the servo loop to prevent thermal overshoot by the heating coil when there is a change in flow rate. The time constant of the RC network is matched to the thermal lag of the transducer portion of the flowmeter to provide optimum operating characteristics. However, the thermal lag is a function of the rate of flow and is substantially greater at low operating flow rates than at high flow rates because of variations in the thickness and velocity of the boundary layer of the fluid.

The present invention provides an improved flowmeter in which the time delay of the RC network is varied according to the flow rate being measured. This is accomplished in brief by using a thermistor for the resistor R of the network, the thermistor having an inverse or negative resistance v. temperature characteristic. The thermistor is heated by suitable means, such as a heating coil surrounding the thermistor, the heating coil being connected in series or parallel with the heater used for heating the fluid in the flowmeter conduit. In this manner, as the flow rate increases and the servo demands that greater heat be applied to the fluid, the thermistor is heated also, reducing its resistance. The time constant of the RC network is thereby reduced for high flow rates while the time constant is increased for low flow rates.

Figure 2:
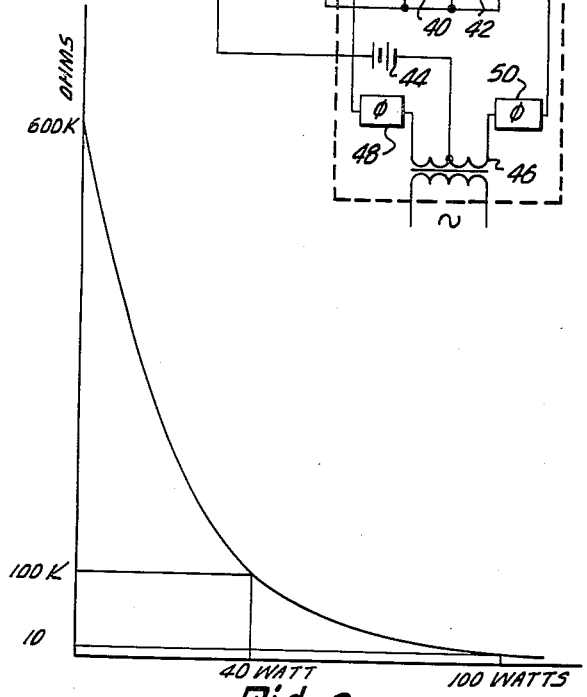

For a more complete understanding of the invention, reference should be had to the accompanying drawing, wherein:

FIG. 1 is a schematic diagram of the flowmeter transducer and associated electrical circuit; and FIG. 2 is a diagram showing the relationship of the series resistance produced by the thermistor of the RC network with changes in the measured flow rate of the fluid.

Referring to FIG. 1 in detail, the numeral 10 indicates generally a pipe or conduit through which the fluid passes. The pipe is made of a thermal-conductive material, e.g., including metals such as copper, silver, aluminum, stainless steel, and the like. Heat is transferred to the boundary layer of the fluid flowing in the conduit by means of a heating coil 12 formed of suitable resistance material wound on the conduit. The coil is heated by passing current therethrough from a suitable A.C. power source. The heating coil 12 is connected through a wattmeter 14 and a watt-hour meter 16 to the power source through a transformer 18. Connected in series between the source and the coil 12 is an impedance transformer 20 by means of which the current in the heating element 12 is controlled in a manner hereinafter described in detail. Also in series with the source and the coil 12 is a small heating element 22 and a variable shunt resistor 24, the functions of which will hereinafter be more fully described.

Wound on either side of the heating coil 12 are temperature sensing resistance coils 26 and 28. These coils are wound of a suitable material, whose resistance varies in proportion to the temperature. Coil 26 is positioned upstream from the heating coil 12 so as to sense the temperature of the fluid in its ambient condition. Coil 28 is positioned downstream of the heating coil 12 so as to sense the temperature of the fluid after being warmed by the heating coil 12.

The temperature sensing resistance coils 26 and 28 are connected as two arms of a bridge, the other two arms of the bridge being provided by a potentiometer 30. An A.C. reference signal is applied across the bridge between the series connection point of the coils 26 and 28 and the sliding tap of the potentiometer 30. Any unbalance of the bridge produces an A.C. signal across the potentiometer 30 whose amplitude is a function of the amount of unbalance. Also, the phase of the A.C. signal has a 180° phase reversal as the bridge goes through its balance condition. The bridge may be balanced by positioning the sliding tap of the potentiometer 30 so that no signal is produced across the potentiometer. Any change in the resistance of the coil 28 due to change in flow rate or change in heating by the coil 12 unbalances the bridge, producing an error signal across the potentiometer 30 which is used to vary the current flow through the heating coil 12.

To this end the error signal developed across the potentiometer 30 is amplified by a suitable A.C. amplifier 32 and applied to the input of a phase detector 34 to which an A.C. reference signal is also applied. The phase detector is a conventional circuit which produces a D.C. output signal whose polarity and magnitude depend upon the phase relation and amplitude of the unbalance signal developed across the potentiometer 30.

The output of the phase detector 34 is used to control the series impedance of the transformer 20 by means of a control circuit 36 to which the output of the phase detector is coupled through a time constant network indicated generally at 38.

The control circuit 36 may be any suitable amplifying circuit by which the load on the secondary of the impedance transformer 20 may be modified according to the magnitude of the signal from the phase detector 34.

One suitable circuit shown by way of example only comprises a pair of thyratron tubes 40 and 42 which are connected in push-pull across the secondary of the transformer 20 so that they may pass current on alternate half cycles. The control signal derived from the output of the network 38 is used to apply varying D.C. bias on the grids of the thyratrons 40 and 42, the average D.C. level being set by a bias battery 44. At the same time, an A.C. signal is superimposed on the grids of the thyratrons 40 and 42 by means of a transformer 46, opposite ends of the secondary of which are connected to the thyratron grids through suitable phase shift networks 48 and 50. This type of thyratron control is well known and involves advancing or retarding the firing time of the thyratrons on the respective conductive half cycles with changes in the D.C. bias produced by the input control signal. By shifting the firing point of the thyratrons 40 and 42, the effective load on the secondary of the transformer 20 is varied, which load is reflected as a varying impedance across the primary of the transformer 20. In this manner a closed loop servo is provided by means of which an unbalance in the bridge due to the change in resistance of the temperature sensing coil 28 produces corresponding changes in the heat supplied by the heating coil 12.

The time delay network 38 includes a capacitor 52 connected across the output of the network together with a shunt resister 54. An adjustable resistor 56 and a temperature sensitive resister 58 are connected in series with the output of the phase detector 34. As discussed above, the time delay of the RC network 38 is normally matched to the thermal time delay of the transducer portion of the circuit, the response time of the RC circuit being equal to or larger than the time lag of the transducer for all flow rates. The only effect of the time delay network is during a transient condition when the potential across the output of phase detector 34 changes abruptly with a change in the condition of the bridge balance. The output potential of the delay circuit 38 changes more slowly due to the charging time of the capacitor 52. However, because the load impedance across the output of the time delay network 38 provided by the control circuit 36 and shunt resistor 54 is quite large and draws negligible current, the steady state potential across the output of the delay network is substantially equal to the input potential and is not materially affected by normal variations in the series resistor 58.

Thus, the function of the phase detector 34, control circuit 36, and time delay network 38 is to vary the series impedance of the winding 20 with changes in the balance condition of the bridge as determined by changes in resistance of the windings 26 and 28. This change in the series impedance of the winding 20 changes the power dissipated by the winding 12 in a manner to restore and maintain balance of the bridge. Thus, a closed loop servo is provided in which the measured wattage is an indication of flow rate.

In order to modify the time constant of the network 38 with varying flow rates, a circuit is arranged according to the present invention so as to make the resistance value of the resistor 58 dependent on the current flow in the heating coil 12. To this end the resistive element 58 comprises a thermistor type resistive element that has an inverse or negative resistance temperature characteristic, i.e., an element whose resistance decreases with an increase in temperature. The heating coil 22, which is shown connected in series circuit with the heating coil 12, surrounds the thermistor element 58 so as to control its temperature and hence its resistance value. It should be noted that the coil 22 can as well be connected in parallel circuit with the heating coil 12, so that the current through the coil 22 changes directly with changes in the current through the series impedance 20.

In this manner as more heat is applied through the coil 12 by increased current flow in the heater circuit, the thermistor element is decreased in resistance, thereby decreasing the time constant of the network 38. In this way the time constant of the network 38 is decreased for increased flow rate, an increase of flow rate requiring greater heating by the coil 12 to restore the balance between the bridge circuit.

As discussed above, the reading of the wattmeter 14 can be directly equated to the rate of flow of fluid in the conduit 10. Likewise the total flow through the conduit 10 over a period of time can be determined by the direct-reading watt-hour meter 16.

It will be recognized from the above description that various modifications of the circuit of FIG. 1 could be made within the scope of the present invention. For example the bridge may be operated as a D.C. bridge, in which case the amplifier 32 would be a D.C. amplifier and the phase detector 34 would be eliminated. This of course entails the inherent limitations in the use of D.C. amplifiers with their characteristic drift in operating point and their change of gain with aging or replacement of vacuum tubes. Likewise the particular control circuit 36 together with the impedance transformer 20 are given by way of example only and other well-known servo control arrangements could be employed.

FIG. 2 graphically shows the relationship between the resistance of a suitable thermistor element and the watts applied to the heating coil 12. It has been found that a thermistor element having the indicated resistance characteristic when used in a network including a capacitor of 150 μfd. and a shunt resistor of 150K ohms gives good performance over a wide range of flow rates.

I claim:

1. A flowmeter for measuring fluid flow comprising a conduit through which the fluid is caused to flow, a first heating coil wound around the conduit for heating the fluid passing through the conduit, first and second thermal-sensitive resistance coils wound on the conduit on opposite sides of the heating coil, a bridge circuit including the first and second thermal sensitive coils for generating an error signal whose magnitude changes in proportion to the changes in the resistance ratio of the first and second coils, means responsive to variations in magnitude of a control signal for controlling current flow through the first heating coil to vary the heating of the fluid in the conduit, means responsive to the power applied to the heating coil for indicating flow rate, a network including a series resistor and shunt capacitor, the error signal derived from the bridge circuit being applied across the resistor and capacitor in series and the control signal applied to said current controlling means being derived across the capacitor, the series resistor having a negative temperature coefficient, whereby its resistance decreases with increase in temperature, and a second heating coil surrounding the series resistor for controlling the temperature thereof, the second heating coil being connected in series with the first heating coil, whereby changes in the rate of heating of the fluid are accompanied by a change in the resistance of said network.

2. Apparatus for sensing changes in fluid flow comprising a conduit through which the fluid is caused to flow, heating means responsive to an electric current for heating the fluid in one region of the conduit, first and second thermal-sensitive means for sensing the temperature of the fluid in the conduit on opposite sides of the heating means, a bridge circuit including the first and second temperature sensitive resistive means for generating an error signal whose magnitude changes in proportion to the changes in the temperature difference between the two temperature sensitive means, means responsive to variations in magnitude of a control signal for controlling current flow through the heating means to vary the heating of the fluid in the conduit, the power dissipated by the heating means being a measure of the flow rate, a network including a series resistor and shunt capacitor coupling the error signal derived from the bridge circuit to said current controlling means, the capacitor being charged from the error signal through the resistor and the current controlling means being connected across the capacitor, the resistor having a negative temperature coefficient, whereby its resistance decreases with increase in temperature, and a heating coil surrounding the resistor for controlling the temperature thereof, the heating coil being connected in series with the heating means, whereby changes in the rate of heating of the fluid are accompanied by a change in the resistance of said network.

3. Apparatus for measuring fluid flow comprising a conduit through which the fluid is caused to flow, heating means responsive to an electric current for heating the fluid in one region of the conduit, first and second temperature sensitive means for sensing the temperature of the fluid in the conduit on opposite sides of the heating means, means including the first and second temperature sensitive means for generating an error signal whose magnitude changes in proportion to the changes in the temperature difference between the two temperature sensitive means, means responsive to variations in magnitude of a control signal for controlling current flow through the heating means to vary the heating of the fluid in the conduit, a network including a resistor and capacitor for coupling the error signal derived from the error signal generating means to said current controlling means, the capacitor being charged from the error signal through the resistor and the current controlling means being connected across the capacitor, the resistor having a negative temperature coefficient, whereby its resistance decreases with increase in temperature, a heating coil surrounding the resistor for controlling the temperature thereof, the heating coil being connected in circuit with the heating means, whereby changes in the rate of heating of the fluid are accompanied by a change in the resistance of said network, and means responsive to the power input to the heating means for providing a measure of the fluid flow rate.

4. Apparatus for sensing changes in fluid flow comprising a conduit through which the fluid is caused to flow, a first heating means responsive to an electric current for heating the fluid in one region of the conduit, first and second temperature sensitive means for sensing the temperature of the fluid in the conduit on opposite sides of the first heating means, means including the first and second temperature sensitive means for generating an error signal whose magnitude changes in proportion to the changes in the temperature difference between the two temperature sensitive means, means responsive to variations in magnitude of a control signal for controlling current flow through the first heating means to vary the heating of the fluid in the conduit, the change in current being an indication of a change in fluid flow, a network including a resistor and capacitor for coupling the error signal derived from the error signal generating means to said current controlling means, the capacitor being charged from the error signal through the resistor and the current controlling means being connected across the capacitor, the resistor having a negative temperature coefficient, whereby its resistance decreases with increase in temperature, and second heating means responsive to an electric current for heating the series resistor, the second heating means being controlled together with the first heating means in response to said current controlling means, whereby changes in the rate of heating of the fluid are accompanied by a change in the resistance of said network.

5. Apparatus for sensing changes in fluid flow comprising a conduit through which the fluid is caused to flow, heating means responsive to an electric current for heating the fluid in one region of the conduit, first and second temperature sensitive means for sensing the temperature of the fluid in the conduit on opposite sides of the heating means, means including the first and second temperature sensitive means for generating an error signal whose magnitude changes in proportion to the changes in the temperature difference between the two temperature sensing means, means responsive to variations in magnitude of a control signal for controlling current flow through the heating means to vary the heating of the fluid in the conduit, the change in current being an indication of a change in fluid flow, a time delay circuit coupling the error signal derived from the error signal generating means to said current controlling means for delaying changes in the error signal that is applied to the current controlling means, and means responsive to changes in the flow rate of fluid in the conduit for varying the time constant of the time delay circuit, said means decreasing the time constant in response to an increase in flow rate.

References Cited in the file of this patent

UNITED STATES PATENTS

| | | |
|---|---|---|
| 2,729,976 | Laub | Jan. 10, 1956 |
| 2,813,237 | Fluegel et al. | Nov. 12, 1957 |
| 2,831,351 | Jacobson | Apr. 22, 1958 |
| 2,832,018 | Laub | Apr. 22, 1958 |